United States Patent Office 3,770,638
Patented Nov. 6, 1973

3,770,638
LIQUID DEVELOPERS CONTAINING METAL SALTS OF ACID DYES
Jonas J. Chechak, St. Petersburg Beach, Fla., assignor to Eastman Kodak Company, Rochester, N.Y.
No Drawing. Continuation-in-part of abandoned application Ser. No. 864,299, Oct. 3, 1969. This application Nov. 3, 1971, Ser. No. 195,458
Int. Cl. G03g 9/04
U.S. Cl. 252—62.1                8 Claims

ABSTRACT OF THE DISCLOSURE

Liquid developers for use in developing electrostatic charge patterns are comprised of an electrically insulating carrier liquid having dispersed therein certain metal salts of water-soluble acid dyes as colorants. The metal salts of water-soluble acid dyes are prepared by reacting the dye with a water-insoluble amine to form a water-insoluble amine salt of said dye, dissolving the salt, adding a metal acetate to the solution and heating the mixture to form the metal salt of the dye.

This application is a continuation-in-part of my copending application Ser. No. 864,299, filed Oct. 3, 1969, now abandoned.

This invention relates to electrography and more particularly to development of electrostatic charge patterns using liquid development techniques and compositions.

Electrophotographic imaging processes and techniques have been extensively described in both the patent and other literature. In electrophotography, it is known to use an element comprised of a support having thereon a layer of a photoconductive composition typically comprising a resinous binder and a photoconductor which can be organic or inorganic. The photoconductive layer while in the dark will accept and retain an electrostatic charge. After charging, such an element is then exposed in a suitable manner to an imagewise pattern of electromagnetic radiation. This exposure causes the charge on the surface of the element to be reduced in accordance with the amount of light incident upon each area of the surface. After exposure, the resultant electrostatic charge pattern is typically developed by applying thereto a charged powder which is attracted to the element in conformity with the charge pattern. The powder is then fixed or fused in some manner to produce a final permanent image, either on the photoconductive element or on a second element to which it may be transferred.

One of the difficulties of this type of development has been the inability to uniformly distribute the powder over the element. If the powder is unevenly applied, the image will similarly be formed in an uneven manner thus resulting in copy which is not a true representation of the original. Also, it is difficult to obtain high resolution using powder developers.

Many of the disadvantages of dry powder developers, such as dust, poor resolution, uneven distribution, etc., can be avoided by the use of a liquid developer. Liquid developers such as those described previously in U.S. Pat. No. 2,907,674 are usually composed of an insulating carrier liquid, a pigment such as carbon black and a resin to fix the pigment to the final support. However, if it is desired to produce an image which is of a color other than black, one must use colorants other than carbon black. A problem often encountered with commercially available colored pigments is that the hue of the pigment is not that which is desired. Thus, a mixture of pigments must be used in order to obtain an image having the proper coloraton. The use of several different pigments in a developer composition usually causes difficulties regarding triboelectric charge characteristics. That is, one pigment may be strongly positively charged; whereas, another one may be only weakly positively charged or even negatively charged. In this case, the mixture of pigment particles does not deposit uniformly and thus there are color variations or hue variations throughout the developed image.

Another problem often encountered with commercially available colorants is that they tend to produce images which are susceptible to smearing when subjected to handling in a humid atmosphere. Further, moisture from human perspiration incident to handling is often sufficient to cause such image smearing.

Accordingly, there is a need in the art for a means of altering the relative absorption peaks of various colorants to control their hue and to give images of a desired color. In addition, there is also a need for colorants which, in addition to producing the desired color, gives good solid area development as well as producing good resolution. There further exists a need for pigments and colorants which produce electrophotographically developed images which are resistant to smearing during handling and stable in the presence of moisture.

It is, therefore, an object of this invention to provide new developer compositions for electrostatic latent images.

It is another object of this invention to provide new liquid electrophotographic develper compositions which give good solid area development and good resolution.

Still anther object of this invention is to provide novel liquid developer compositions for electrostatic charge patterns, which compositions contain pigments having good coloration.

Yet another object of this invention is to provide novel liquid developer compositions which produce electrophotographic images which are stable in the presence of moisture or a humid atmosphere, and which resist smearing during handling.

A further object of this invention is to provide a novel method for preparing metal salts of water-soluble acid dyes for use as pigments in developer compositions used in developing electrostatic charge patterns.

These and other objects and advantages are accomplished in accordance with this invention by the preparation and use of metal salts of water-soluble acid dyes. Such metal salts are typically formed by reacting the dye with a water-insoluble amine compound, dissolving the resultant amine salt and adding a metal acetate to the resultant solution to cause displacement of the amine, thus forming the metal salt of the dye. The metal salt is then dispersed in a suitable carrier liquid to form a liquid developer composition for developing electrostatic charge patterns.

The colorants of the present invention can be prepared from a wide variety of water-soluble acid dyes. Preferably, the dyes used have sulfonic and/or carboxylic acid groups contained thereon. Ammonium salts and alkali metal salts such as potassium, sodium, etc. salts of the dyes are especially preferred starting materials. These water-soluble dyes are dissolved in water and a water-insoluble amine compound is added to the aqueous solution. The amine compound reacts with the water-soluble dye to form a water-insoluble amine salt. This reaction is conducted in an acidic medium, typically in the presence of acetic acid and a lower aliphatic alcohol, for example, an alkanol having 1 to 4 carbon atoms in the alkyl moiety, such as methanol, ethanol, propanol, butanol, etc. The reaction is usually carried on at a temperature between room temperature and about 60° C. at atmospheric pressure. The amine dye salt is precipitated during the course of the reaction, often in the form of a sticky mass which solidifies upon cooling to room temperature. The dye salt is filtered off and washed and then dissolved in an alkanol as above with heating. Next, a metal acetate is added to the alcohol solution of the amine salt of the dye. Heating is continued during which the metal of the acetate replaces the amine in the dye moiety to form the metal salt of the acid dye. The resultant amine acetate is removed leaving the desired metal salt of the acid dye. A variety of metal acetates can be used in this reaction with the acetates of cadmium, cobalt, lead, magnesium and zinc being preferred.

Preferred water-insoluble amines are typically primary and secondary amines. Useful amines include alkylamines having from 7 to 25 carbon atoms in the alkyl moiety such as heptyl, octyl, decyl, dodecyl, etc.; dialkylamines wherein at least one alkyl radical has from 7 to 25 carbon atoms as described above; arylamines including substituted arylamines and diarylamines; and aralkylamines having from 1 to 10 carbon atoms in the alkyl moiety. Particularly useful amines are aryl-substituted guanidines wherein the aryl moiety can be a phenyl radical or a substituted phenyl radical such as tolyl, ethylphenyl, propylphenyl, butylphenyl, etc. Illustrative amine compounds useful herein include aniline, naphthylamine, benzylamine, octylamine, dioctylamine, decylamine, dodecylamine, heptylamine, dibenzylamine, ethylbenzylamine, cyclohexylamine, diphenylguanidine, di-o-tolylguanidine, triphenylguanidine and the like.

The colorants of the present invention can be provided in a variety of hues. The hue of the present metal dye salts can be varied slightly by changing the amount of metal acetate used in their preparation. By virtue of the different valence states of the metals used, one metal atom can react with more than one acid site. Of course, one metal atom need react with only one acid site leaving any other acid site on the dye molecule free to take up a hydroxy group. In addition, one metal atom can bridge two dye moieties together by reacting with one acid site on each dye molecule. The exact mechanism involved in the reaction of a metal with the dye is not known. However, I have discovered that the metal can be added in a molar amount considerably greater than that needed to precipitate the dye and the metal will still be taken up by the dye. In general, the amount of metal acetate added to the reaction is such that the mole ratio of metal to dye is from about 1:1 to about 14:1. The variation in hue obtained by changing the amount of metal used is shown in Example 8 below.

After the pigment is formed in accordance with the process of the present invention, it is used to prepare a liquid developer suitable for developing electrostatic charge patterns. Typical developers are prepared by grinding or ball milling one of the pigments with a suitable polymer solution and diluting this concentrate with an insulating carrier liquid. The resultant developer is in the form of a carrier liquid having dispersed therein toner particles comprised of the pigments of this invention and a suitable resinous material. Carrier liquids which may be used to form such developers can be selected from a wide variety of materials. Preferably, the liquid has a low dielectric constant and a very high electrical resistance such that it will not disturb or destroy the electrostatic latent image. In general, useful carrier liquids should have a dielectric constant of less than about 3, should have a volume resistivity of greater than about $10^{10}$ ohm-cm. and should be stable under a variety of conditions. Suitable carrier liquids include halogenated hydrocarbon solvents, for example, fluorinated lower alkanes, such as trichloromonofluoromethane, trichlorotrifluoroethane, etc., having a typical boiling range of from about 2° C. to about 55° C. Other hydrocarbon solvents are useful such as isoparaffinic hydrocarbons having a boiling range of from about 145° C. to about 185° C. such as Isopar G (Humble Oil & Refining Co.) or cyclohydrocarbons having a major aromatic component and also having a boiling range of from about 145° C. to about 185° C., such as Solvesso 100 (Humble Oil & Refining Co.). Additional useful carrier liquids include polysiloxanes, odorless mineral spirits, octane, cyclohexane, etc.

In addition to the colorants of the present invention which are dispersed in the carrier liquid, a resinous material can be used if desired to facilitate binding of the colorant to the surface to be developed. Suitable resinous materials used in the present developers appear to form a coating around each colorant particle and thus also facilitate dispersion of the colorants in the carrier liquid. Useful resins can be selected from a wide variety of substances. The following are illustrative of suitable materials: rosins, including hydrogenated rosins and esters of hydrogenated rosins, alkyl methacrylate copolymers having from 2 to 5 carbon atoms in each alkyl moiety, such as isobutyl methacrylate and normal butyl methacrylate copolymers, etc.; phenolic resins including modified phenolic resins such as phenol formaldehyde resins; pentaerythritol phthalate; coumaroneindene resins; ester gum resins; vegetable oil polyamides; alkyd resins, including modified alkyds such as soya oil-modified and linseed oil modified alkyds, phthalic, maleic and styrenated alkyds, etc.; and the like.

In addition, the electrostatic charge polarity of the toner particles of the present invention can be enhanced or altered by the addition of suitable charge control agents if so desired. A variety of materials can be used as charge control agents. Illustrative of suitable charge agents would be the polyoxyethylated alkyl surfactants such as polyoxyethylated alkylamine, polyoxyethylene palmitate, polyoxyethylene stearate, etc. Other useful materials are magnesium and heavier metal soaps of fatty and aromatic acids as described in Beyer U.S. Pat. No. 3,417,019. Useful metal soaps include cobalt naphthenate, magnesium naphthenate and maganese naphthenate, zinc resinate, calcium naphthenate, zinc linoleate, aluminum resinate, isopropyl-titantium stearate, aluminum stearate, and others many of which are also described in U.S. Pat. No. 3,259,581. Typically, the amount of such materials used in less than about 2% by weight based on the weight of toner. In certain instances, the resinous binder per se can function as the charge control agent as can the colorant.

Suitable developer compositions can be prepared simply by grinding the pigments to the appropriate size and dispersing the pigment powder in a carrier liquid without the addition of a resinous binder and/or charge control agent. A developer which does not contain a binder material would produce developed images which were not fixed. Accordingly, it would be necessary to overcoat such images by spraying with a lacquer composition in order to hold the pigment particles in place. The pigment particles of the present invention generally have an average particle size of from about 0.05 to about 5μ, with preferred materials in the range of from about 0.1 to about 1 micron. Typical developer compositions of this invention will contain the present pigments in a concentration of from about 0.01 to about 1.0 gram per liter. When a resin binder is used, the pigment to binder weight ratio can vary from about 1:20 to about 2:1.

Particularly useful colorants for preparing liquid developer compositions include copper phthalocyanine tetrasulfonate metal salt,
1-carbethoxy-3-methyl-6-(4'-chloro-3'-sulfoanilino)-
2-oxo-2,3-dihydrobenzanthrone metal salt,
1-(p-sulfophenyl-3-phenyl)-4-(2,5-dichloro-4-sulfo-
benzylazo)-5-pyrazolone di-metal salt,
1-(p-sulfophenyl)-3-methyl-4-(4,8-disulfonaphthyl-2-
azo)-5-pyrazolone tri-metal salt,
4,4'-bis(2-amino-8-hydroxy-6-sulfonaphthyl-1-azo)-di-
phenylurea di-metal salt,
1-(6-sulfonaphthyl-2-azo)-4-hydroxy-3-carboxybenzene
di-metal salt,
4-(2-amino-8-hydroxy-6-sulfonaphthyl-1-azo)-diphenyl
di-metal salt, 4,4'-bis(3-carboxy-4-hydroxy-5-methylphenylazo)-diphenyl di-metal salt and
4,8-diamino-1,5-dihydroxy-2-sulfoanthraquinone metal salt, wherein the metal of said metal salt can be cadmium, cobalt, lead, magnesium, and zinc. These materials are merely representative and are not intended to limit the present invention.

The following examples are included for a further understanding of the invention.

EXAMPLE 1

The preparation of the magnesium salt of copper phthalocyanine tetrasulfonic acid is as follows. A 150 g. portion of sodium copper phthalocyanine tetrasulfonate is dissolved in 3.6 liters of water at 90° C. and allowed to cool to 40° C. The resultant aqueous solution is stirred well while a solution of 180 grams of triphenylguanidine in 375 ml. of glacial acetic acid, 1500 ml. of ethyl alcohol and 375 ml. of water is added. An intermediate triphenylguanidine salt precipitates as a sticky mass which solidifies upon further cooling. The triphenylguanidine salt is filtered off and stirred with 3.5 liters of cold water for ½ hour to reduce the lumps to a coarse powder. The material is then filtered again and pressed dry to remove as much water as possible followed by complete drying on a steam bath until the sticky mass which results becomes brittle. About 220 grams of the triphenylguanidine dye salt result from this procedure. Next, 50 grams of the triphenylguanidine salt prepared as above are dissolved in 1.5 liters of methyl alcohol and 2 liters of ethyl alcohol by heating on a steam bath while stirring. A 22 gram portion of magnesium acetate tetrahydrate is then added and stirring is continued while heating the combination on a steam bath until the alcohols have evaporated. The resultant substantially dry pigment is ground up and extracted with two successive portions of 3 liters of hot acetone followed by filtering and drying on the steam bath. This procedure results in a yield of 52 grams of the magnesium salt of copper phthalocyanine tetrasulfonic acid having a dye to metal molar ratio of 1:4.

EXAMPLE 2

The procedure of Example 1 is repeated again using 55 grams of magnesium acetate tetrahydrate. This procedure results in a magnesium dye salt having a dye to metal molar ratio of 1:10.

EXAMPLE 3

The procedure of Example 1 for forming the triphenylguanidine salt of copper phthalocyanine tetrasulfonate is repeated. Next, 50 g. of the triphenylguanidine salt are dissolved in alcohol as in Example 1. To the dissolved triphenylguanidine salt is added a 37 g. portion of lead acetate trihydrate while stirring and heating the mixture to the point where the alcohols evaporate. The resultant substantially dry pigment is ground up and extracted with two successive portions of hot acetone followed by filtering and drying on the steam bath. The acetone extraction removes the triphenylguanidine acetate which is displaced by the lead.

EXAMPLE 4

An intermediate triphenylguanidine salt of copper phthalocyanine tetrasulfonic acid is prepared as in Example 1. Next, 50 g. of the salt are disolved in alcohol as in Example 1 followed by the addition of 27 g. of cadmium acetate dihydrate with stirring and heating on a steam bath to the point of evaporaton of the alcohols. The resultant pigment is ground up and extracted with two successive portions of hot acetone, filtered and dried on the steam bath.

EXAMPLE 5

The cobalt salt of copper phthalocyanine tetrasulfonic acid is prepared in a manner similar to that used in Example 1, except that the magnesium acetate is replaced by 12.5 g. of cobalt acetate tetrahydrate.

EXAMPLE 6

A 10.0 gram portion of 1-carbethoxy-3-methyl-6-(4'-chloro-3'-sulfoanilino)-2-oxo-2,3-dihydrobenzanthrone sodium salt is dissolved in hot water and allowed to cool. Next, 8.0 grams of di-o-tolyl-guanidine in 16 ml. glacial acetic acid, 60 ml. ethyl alcohol and 20 ml. water are added to the above solution as in Example 1. The di-o-tolyl-guanidine salt precipitates to a mass which solidifies on cooling. The resultant mass is filtered and stirred with cold water to reduce the material to a coarse powder. It is filtered, pressed dry and then completely dried on a steam bath to yield 12.5 g. of salt. The di-o-tolyl-guanidine salt is treated with cadmium acetate in place of the magnesium acetate in accordance with the general procedures in Example 1. The resultant pigment is ground up and extracted with hot acetone, filtered and dried as in the preceding examples.

EXAMPLE 7

The general procedure of Example 1 is again repeated using 1-(p-sulfophenyl-3-phenyl)-4-(2,5-dichloro-4-sulfophenyl-azo)-5-pyrazolone disodium salt and triphenylguanidine to form the triphenylguanidine salt of the dye which is in turn treated with magnesium acetate as in Example 1 to form the magnesium salt of the dye.

EXAMPLE 8

Using the procedure of Example 1, the cadmium, lead, magnesium, zinc and cobalt salts of copper phthalocyanine tetrasulfonic acid are prepared using varying amounts of metal acetate in the preparation which results in a variation in the molar ratio of metal to dye. A variation in the molar ratio of metal to dye produces a difference in hue of the various pigments formed. The optical density (D) of the different pigments is measured at 625 nm. and at 680 nm. using a Carey recording spectrophotometer. The results of these measurements are shown in Table I below.

TABLE I

| Dye, moles | Metal | Moles | $D_{625}$ | $D_{680}$ | Ratio $D_{625}/D_{680}$ |
|---|---|---|---|---|---|
| 1.0 | Cadmium | 2.0 | 0.61 | 1.50 | 0.41 |
| 1.0 | do | 4.1 | 0.78 | 1.50 | 0.52 |
| 1.0 | do | 11.5 | 1.20 | 1.50 | 0.80 |
| 1.0 | Lead | 2.0 | 0.72 | 1.50 | 0.48 |
| 1.0 | do | 4.0 | 1.08 | 1.50 | 0.72 |
| 1.0 | do | 8.0 | 1.50 | 1.50 | 1.00 |
| 1.0 | Magnesium | 2.0 | 0.74 | 1.50 | 0.49 |
| 1.0 | do | 4.0 | 0.80 | 1.50 | 0.53 |
| 1.0 | do | 10.0 | 1.14 | 1.50 | 0.76 |
| 1.0 | Zinc | 2.0 | 0.71 | 1.50 | 0.47 |
| 1.0 | do | 11.0 | 1.11 | 1.50 | 0.74 |
| 1.0 | Cobalt | 2.0 | 0.54 | 1.50 | 0.36 |
| 1.0 | do | 4.0 | 1.50 | 1.50 | 1.00 |

From the above, it can be seen that from the lowest ratio of 2 moles metal to 1 mole dye, the density at 625 nm. is less than half that at 680 nm.; whereas, raising the metal content increases the density at 625 nm. to a value of close to that at 680 nm. The result is an alteration in the hue of the various materials.

EXAMPLE 9

The pigments produced in accordance with Examples 1 through 8 are used to prepare liquid developer compositions for use in developing electrostatic charge patterns. These developer compositions are prepared by combining the following materials and ball milling them for a period of about 7 days.

| | |
|---|---|
| Pigment | g 1 |
| Phenol-formaldehyde | g 3 |
| Soya oil-modified phthalic alkyd resin | g 1 |
| Solvent | ml 15 |

After ball milling, the particle size of the resultant material is about 1 to 5 microns. The solvent used is a cyclohydrocarbon having a major aromatic component and having a boiling range of from about 300 to 360° F. (Solvesso 100, Humble Oil & Refining Co.). Two and a half grams of the above concentrate are added dropwise to 250 ml. of an electrically insulating carrier liquid which is comprised of an isoparaffinic hydrocarbon having a boiling range of from about 300 to 360° F. (Isopar G, Humble Oil & Refining Co.) containing 0.2 gram of cobalt naphthenate and 0.45 gram of a 1.5% solution of aluminum stearate in xylene. The resultant mixture is vigorously agitated for 3 minutes after the addition of all the concentrate. The resultant developers are then used to develop an electrostatic charge pattern carried on an electrophotographic element comprised of a poly(ethylene terephthalate) film base having a conductive substrate which is overcoated with a photoconductive layer comprising an organic photoconductor and a polycarbonate resin binder. The resultant image developed on the electrophotographic element is transferred to a white receiving paper and dried to form a stable image. The images produced with these developers show good solid area reproduction as well as exhibiting good resolution properties. In addition, the images are quite stable in the presence of moisture, and resist smearing during ordinary handling.

EXAMPLE 10

The pigment produced in accordance with Example 1 is ground to form particles having a size of from 1 to 5 microns. The powdered pigment is then dispersed in Isopar G as described in the preceding example. The resultant developer is then used to develop an electrostatic charge pattern carried on an image-bearing element as described in the preceding example. The resultant developed image is transferred to a paper receiving sheet to form a developed image thereon. The transferred image is then sprayed with a lacquer to form a permanent image.

EXAMPLE 11

A 20.0 gram portion of sodium copper phthalocyanine tetrasulfonate is dissolved in 500 ml. of water at 90° C. and allowed to cool to 40° C. While stirring well, a solution of 19.0 grams of di-octylamine in 40 ml. of glacial acetic acid, 150 ml. ethyl alcohol and 40 ml. of water also at 40° C. is added. The pigment separates almost at once but stirring is continued for ½ hour more. The pigment is filtered off and pressed dry. The wet filtrate is stirred up with 600 ml. cold water to form a fine powder which is filtered off and pressed dry. The pigment is then dried on a steam bath until the mass which is sticky at first becomes brittle. The pigment is ground to a powder and extracted with two 300 ml. portions of hot acetone and then dried on a steam bath. The yield is about 25 g. of pigment. This material is converted to cadmium, zinc, lead, magnesium, or cobalt salt using various metal acetates as in Examples 1 and 8.

EXAMPLE 12

The procedure of Example 7 is repeated with the exception that α-naphthylamine is used in place of the triphenylguanidine. The resultant pigments and the pigments of Example 11 are used to prepare developers as in Example 7 and used to develop electrostatic charge patterns as in Example 7. Good images result using these developers.

EXAMPLE 13

50 mg. each of sodium, lead, cadmium, cobalt, zinc and magnesium metal salt of copper phthalocyanine tetrasulfonate are each added to 5 ml. of 20% Amberol ST 137 phenol-formaldehyde resin binder in Solvesso 100 carrier liquid and each ball-milled for 24 hours in a ball mill using 8 g. steel balls to form seven dispersions of metal salts of copper phthalocyanine tetrasulfonate. 1 ml. of each dispersion so formed is then coated on a 4 in. by 5 in. sheet of receiving paper used to make liquid-developed xerographic prints, and ½ hour then allowed for the carrier liquid on each coated sheet to evaporate. The coatings are then air-dried at 90–100° for 90 seconds to effect curing. Each of the seven coated and cured sheets is then cut into a 16 mm. x 80 mm. strip and immersed for two minutes in separate Pyrex 18 mm. x 150 mm. O.D. test tubes each containing 25 ml. distilled water. The relative amount of colorant which bleeds (dissolves) from each strip into the water contained in the test tubes is then determined by measuring the relative amount of light transmitted through a sample of the distilled water taken from each of the seven tubes by using a Bausch and Lomb "Spectronic 20" spectrophotometer at an incident light radiation of 620 nm. The relative amounts are measured in terms of percent transmission T, the highest percent T representing the lowest amount of colorant bleeding in the presence of moisture and thus indicating greatest stability to moisture.

The results of each of the experiments to determine the relative amount of light transmitted through the distilled water in the test tubes and hence the relative stability to moisture are then tabulated in Table II below, wherein column 1 lists the metal salt of copper phthalocyanine tetrasulfonate employed, column 2 the mole ratio of anionic dye radical (i.e. copper phthalocyanine tetrasulfonate) to metal cation, and column 3 the percent transmission T at 620 nm.

TABLE II

| Column 1 | Column 2 | Column 3 |
|---|---|---|
| Metal salt | Mole ratio anion/cation | Percent transmittance T |
| Na (prior art) | 1:4 | 89.0 |
| Pb | 1:8 | 98.0 |
| Pb | 1:4 | 97.0 |
| Cd | 1:11 | 95.0 |
| Co | 1:2 | 98.5 |
| Zn | 1:2 | 100.0 |
| Mg | 1:10 | 94.5 |
| Distilled water | | 100.0 |

It is evident from the above tests that the metal salts of water-soluble acid dyes employed in the practice of the present invention offer a superior stability in the presence of moisture over prior art sodium salts.

The invention has been described in detail with particular reference to certain preferred embodiment thereof, but it will be understood that variations and modifications can be effected within the spirit and scope of the invention.

I claim:

1. A liquid developer for developing electrostatic charge patterns comprising an electrically insulating carrier liquid having a volume resistivity greater than about $10^{10}$ ohm-cm. and a dielectric constant less than about 3, said carrier liquid having dispersed therein marking particles comprising a pigment selected from the group consisting of cadmium, cobalt, lead, magnesium and zinc salts of a dye selected from the group consisting of water soluble sulfonated acid dyes and water soluble carboxylated acid dyes, said marking particles being of an average size of from about 0.05 to about 5 microns.

2. A liquid developer as described in claim 1 wherein the marking particles contain a resin binder.

3. A developer as described in claim 1 wherein said marking particles are of an average size of from about 0.1 to about 1.0 micron.

4. A developer composition for use in developing electrostatic charge patterns comprising an electrically insulating carrier liquid having a volume resistivity of greater than about $10^{10}$ ohm-cm. and a dielectric constant less than about 3, said carrier liquid having dispersed therein marking particles comprising (a) a pigment selected from the group consisting of cadmium, cobalt, copper, lead, magnesium and zinc salts of sulfonated or carboxylated water-soluble acid dyes, said marking particles being of an average size of from about 0.05 to about 5 microns, (b) a resin binder and (c) a charge control agent.

5. A developer as described in claim 4 wherein said marking particles are of an average size of from about 0.1 to about 1.0 micron.

6. A liquid developer comprising an electrically insulating hydrocarbon carrier liquid having a volume resistivity of greater than about $10^{10}$ ohm-cm. and a dielectric constant less than about 3, said carrier liquid having dispersed therein marking particles comprising a resinous binder material and a pigment selected from the group consisting of copper phthalocyanine tetrasulfonate metal salt,
1-carbethoxy-3-methyl-6-(4'-chloro-3'-sulfoanilino)-2-oxo-2,3-dihydrobenzanthrone metal salt,
1-(p-sulfophenyl-3-phenyl)-4-(2,5-dichloro-4-sulfophenylazo)-5-pyrazolone di-metal salt,
1-(p-sulfophenyl)-3-methyl-4-(4,8-disulfonaphthyl-2-azo)-5-pyrazolone tri-metal salt,
4,4'-bis(2-amino-8-hydroxy-6-sulfonaphthyl-1-azo)-diphenylurea di-metal salt,
1-(6-sulfonaphthyl-2-azo)-4-hydroxy-3-carboxybenzene di-metal salt,
4-(2-amino-8-hydroxy-6-sulfonaphthyl-1-azo)-diphenyl di-metal salt,
4,4'-bis(3-carboxy-4-hydroxy-5-methyl-phenylazo) diphenyl di-metal salt and
4,8-diamino-1,5-dihydroxy-2-sulfoanthraquinone metal salt, wherein the metal of said metal salt is selected from the group consisting of cadmium, cobalt, copper, lead, magnesium and zinc, and wherein said marking particles are of an average size of from about 0.05 to about 5 microns.

7. A developer as described in claim 6 wherein said marking particles are of an average size of from about 0.1 to about 1.0 micron.

8. A liquid developer as described in claim 6 wherein said pigment is present in an amount of about 0.01 to about 1.0% by weight of the total developer composition.

References Cited

UNITED STATES PATENTS

| | | | |
|---|---|---|---|
| 3,647,696 | 3/1972 | Olson | 252—62.1 |
| 3,438,904 | 4/1969 | Wagner | 252—62.1 |
| 3,417,019 | 12/1968 | Beyer | 252—62.1 |
| 3,253,913 | 5/1966 | Smith et al. | 252—62.1 |
| 3,135,695 | 6/1964 | York | 252—62.1 |

FOREIGN PATENTS

| | | | |
|---|---|---|---|
| 254,262 | 2/1961 | Australia | 252—62.1 |

NORMAN G. TORCHIN, Primary Examiner

J. B. BRAMMER, Assistant Examiner

U.S. Cl. X.R.

117—37 LE